United States Patent [19]

Barnett

[11] Patent Number: 5,432,702
[45] Date of Patent: Jul. 11, 1995

[54] BAR CODE RECIPE SELECTION SYSTEM USING WORKSTATION CONTROLLERS

[75] Inventor: Gerald W. Barnett, Austin, Tex.

[73] Assignee: Advanced Micro Devices Inc., Sunnyvale, Calif.

[21] Appl. No.: 259,971

[22] Filed: Jun. 17, 1994

[51] Int. Cl.$^6$ .................... G06F 17/60; G06F 19/00
[52] U.S. Cl. .................... 364/468; 364/474.11; 235/375
[58] Field of Search .................... 364/468, 478, 474.11, 364/131–135, 401–403; 235/375, 376, 383, 385

[56] References Cited

U.S. PATENT DOCUMENTS

| | | | |
|---|---|---|---|
| 4,472,783 | 9/1984 | Johnstone et al. | 364/468 X |
| 4,974,166 | 11/1990 | Maney et al. | 364/468 X |
| 5,121,331 | 6/1992 | Lourenich | 364/468 |
| 5,150,288 | 9/1992 | Imai et al. | 364/468 X |
| 5,231,585 | 7/1993 | Kobayashi et al. | 364/468 |

*Primary Examiner*—Joseph Ruggiero
*Attorney, Agent, or Firm*—Foley & Lardner

[57] ABSTRACT

A barcode processing system for a semiconductor wafer, comprising a workstation controller, a bar code reader attached to the workstation controller for reading a bar code assigned to the wafer, a tool assigned to the workstation controller for processing the wafer, and a host computer assigned to the tool and the workstation controller for determining the appropriate process to be performed on the wafer.

The bar code read by the bar code reader is sent to the workstation controller, and the workstation controller requests processing information from the host computer, wherein that request includes information obtained from the bar code read by the bar code reader and sent to the workstation controller. The host computer determines an appropriate process step, or recipe, to be applied to the wafer based upon the information received from the processing information request from the workstation controller, and sends this information to the workstation controller.

The workstation controller determines an appropriate process associated with this process step. Once the workstation controller has the appropriate process to be applied to the wafer, the workstation controller determines if that process can be performed by the tool associated with the workstation controller. If the process can be performed by the tool, the recipe is sent to the tool so that the tool has the information it needs to process the wafer.

12 Claims, 4 Drawing Sheets

BAR CODE RECIPE SELECTION SYSTEM USING WORKSTATION CONTROLLERS

BACKGROUND OF THE INVENTION

1. Field of the Invention

This invention relates to an improved method and apparatus for processing semiconductor wafers, and more particularly to a method and apparatus directed towards ensuring the accuracy of the process.

2. Description of the Related Art

Many present-day systems for semiconductor wafer fabrication utilize a computer to control a tool, where the tool is used for such processes as chemical vapor deposition (CVD). Wafers are placed into the tool and a process is performed on those wafers as one step in the process of fabricating semiconductor wafers. The process that is performed on the semiconductor wafer in the tool is known as a "recipe" which consists of various processing sequences that are performed on the wafer, such as specified temperatures and pressures applied to the wafer over specified periods of time while a particular gas is flowed. A wafer will typically be processed with different recipes and at different tools, at different stages of the semiconductor wafer fabrication process.

Given the large number of wafers that must be processed and the various recipes that are appropriate, it is possible for the wrong recipe to be run on a wafer, thereby destroying them, or rendering them unsuitable for use as semiconductors. It would be desirable to have a production system that minimized potential production errors relating to manufacturing of semiconductor errors.

SUMMARY OF THE INVENTION

Therefore, it is an object of this invention to provide a method and apparatus for processing a semiconductor wafer, to simplify the processing of the wafer from the operator's standpoint, minimize the possibility that the wrong recipe is run on the lot and to enhance the ability of software to track the processing of a lot through the production process.

It is another object of this invention to facilitate monitoring the status of the wafer, the tool, and the process so the information relating to the status can be displayed at the tool.

It is still another object of this invention to provide for an error message to be sent to the tool if the workstation controller determines that the tool assigned to the workstation controller cannot perform the process.

These and other objects of the invention are accomplished by providing a method and apparatus in which a workstation controller is provided which is dedicated to a particular tool. Each wafer (or lot of wafers) has a bar code associated with the lot identifying the wafer. The workstation controller has a bar code reader attached which scans the bar code associated with the lot. The lot information is then provided by the workstation controller to a host computer which determines the appropriate process step to apply to the wafer based on the identification information. The host computer sends back to the workstation controller information indicating the appropriate process step to perform on the wafer.

The workstation controller receives this information from the host computer and determines an appropriate process, or recipe, associated with that process step. Once the workstation controller has determined the appropriate process, it sends that information to the associated tool which performs the specified process on the wafer. If the tool is not appropriate for the wafer, an error message is sent from the workstation controller for display at the tool. Further, information relating to the lot and the operation of the process may be displayed at the tool.

BRIEF DESCRIPTION OF THE DRAWINGS

The features of the present invention are set forth with particularity in the appended claims. The invention, together with further objects and advantages thereof, may best be understood by making reference to the following description taken in conjunction with the accompanying drawing, and wherein:

DETAILED DESCRIPTION OF THE PREFERRED EMBODIMENT

Figure 1:
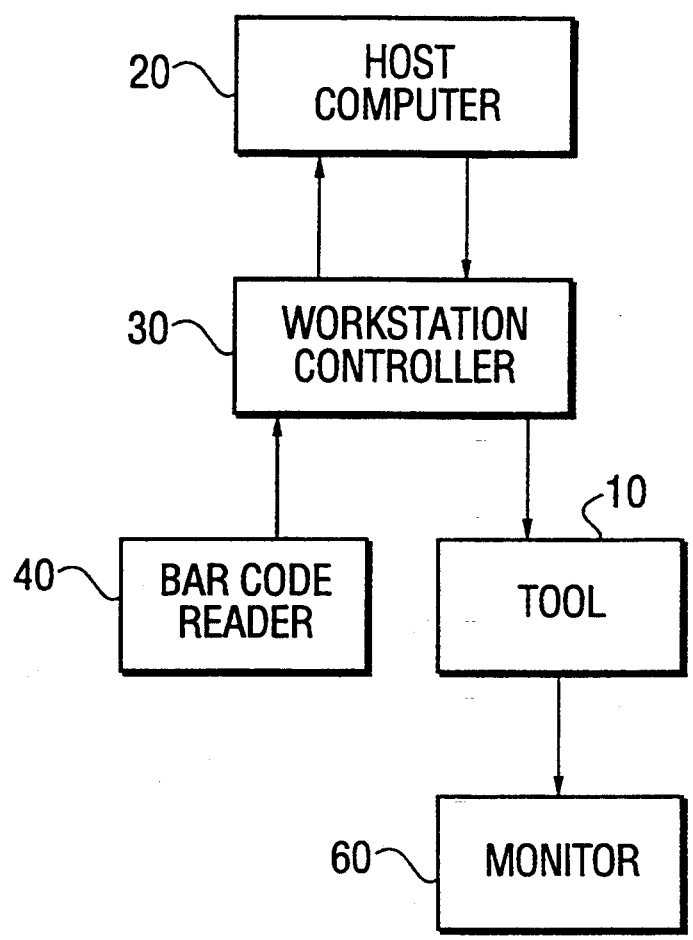
FIG. 1 illustrates one embodiment of the semiconductor processing system according to the present invention.

Referring to FIG. 1, the processing system according to the present invention is shown. A tool 10 performs the process on the wafer. The tool 10, used in a semiconductor fabrication process, may be, e.g., a chemical vapor deposition tool such as NOVELLUS CONCEPT ONE or an etching tool such as the LAM-RESEARCH RAINBOW. The tool 10 performs a process (i.e. a recipe consisting of a sequence of process steps typically relating to temperature, pressure, gas flow, etc.) on a wafer. The tool 10 may be provided the details of the recipe externally, e.g. from the workstation controller 30. Alternately, the tool 10 maintains a table of recipes and performs a particular process when provided the appropriate process identification, i.e. the name of the recipe. The tool 10 typically has an integrally mounted monitor 60.

A workstation controller 30 is uniquely associated with the tool 10. The workstation controller 30 is typically a microprocessor based platform such as a personal computer. The workstation controller 30 communicates with the tool 10 in the preferred embodiment via a Semiconductor Equipment Communication Standard (SECS-2) interface over a standard computer interface. The workstation controller 30 is also connected to a host computer 20 via a standard computer-to-computer interface, such as the kind used in local area networks. In the preferred embodiment, the host computer 20 is a mainframe computer, such as the VAX 1170.

In order to identify a particular wafer, according to the present invention, each lot is identified by a barcode attached to the a card. The identification is typically an alphanumeric code. Each lot has associated with it a particular route. A route indicates a sequence of production steps (e.g. first deposition, etch, second deposition, etc.) required to produce a semiconductor. A particular "step" in the route is performed at the tool. A sequence of "process steps" are performed at the tool to complete the "step."

A barcode reader 40 is provided which interfaces with the workstation controller 30 in a manner known in the art, The barcode reader 40 reads the lot identification from the run card associated with a particular lot of wafers. Typically, more than one wafer is in any given lot, although it is possible that a lot is comprised of a single wafer. The lot information is used by the control software (as described further herein) to determine the appropriate steps to perform on the lot.

Figure 2:
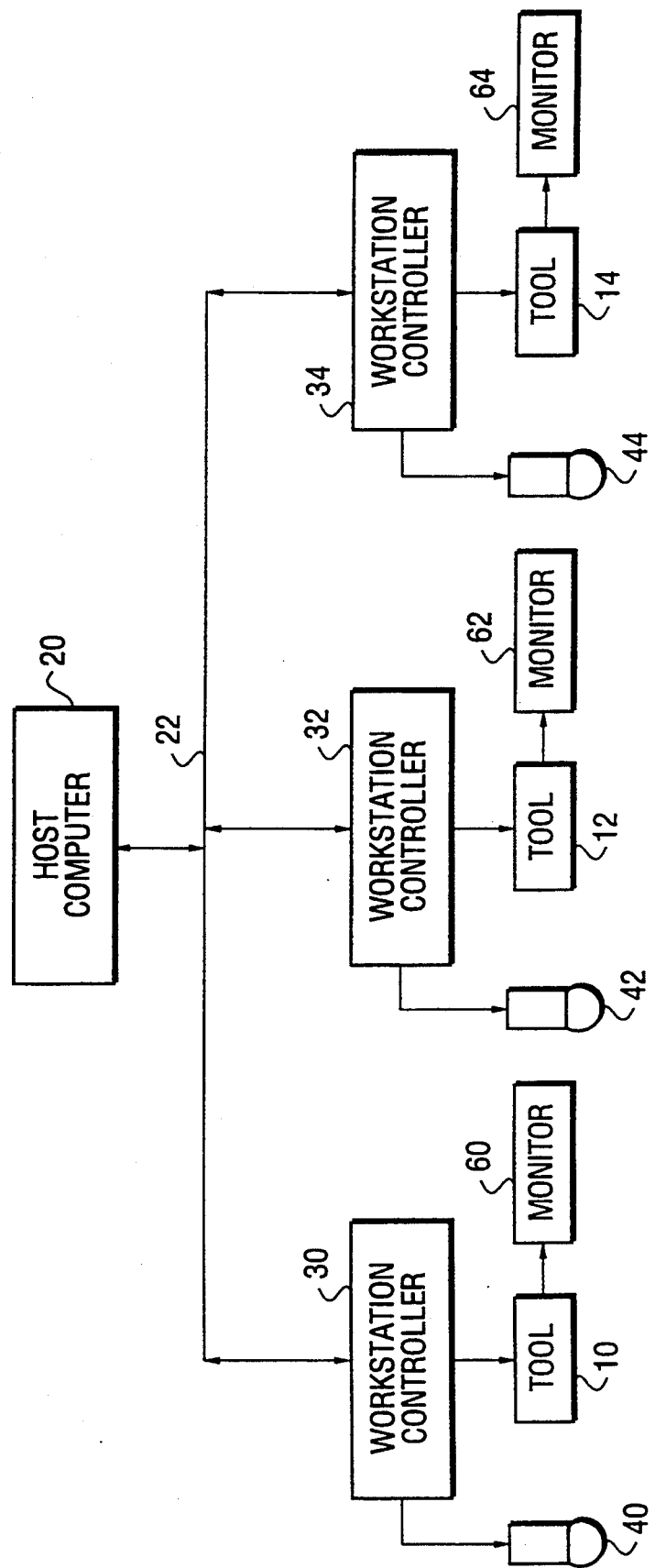
FIG. 2 illustrates a semiconductor processing system according to the present invention in which multiple workstation controllers are connected to the host computer.

Referring now to FIG. 2, the host computer 20 is connected in the preferred embodiment to a plurality of workstation controllers 30, 32, 34, via a network 22. The workstations 30, 32 and 34 are in turn, respectively connected to tools 10, 12 and 14 and barcode readers 40, 42, and 44. The tools 10, 12 and 14 are connected to their respective monitors 60, 62 and 64. The present invention includes both hardware and software which are used together to form a bridge between a tool 10 and a host computer 20 which controls the fabrication process.

According to the present invention, all of the required operator elements needed to perform a wafer fabrication are clustered together to minimize errors in the wafer fabrication process. Alternative arrangements, in which a workstation controller controls multiple tools, or a barcode reader is centralized, might lead to increased operator errors.

Figure 3:
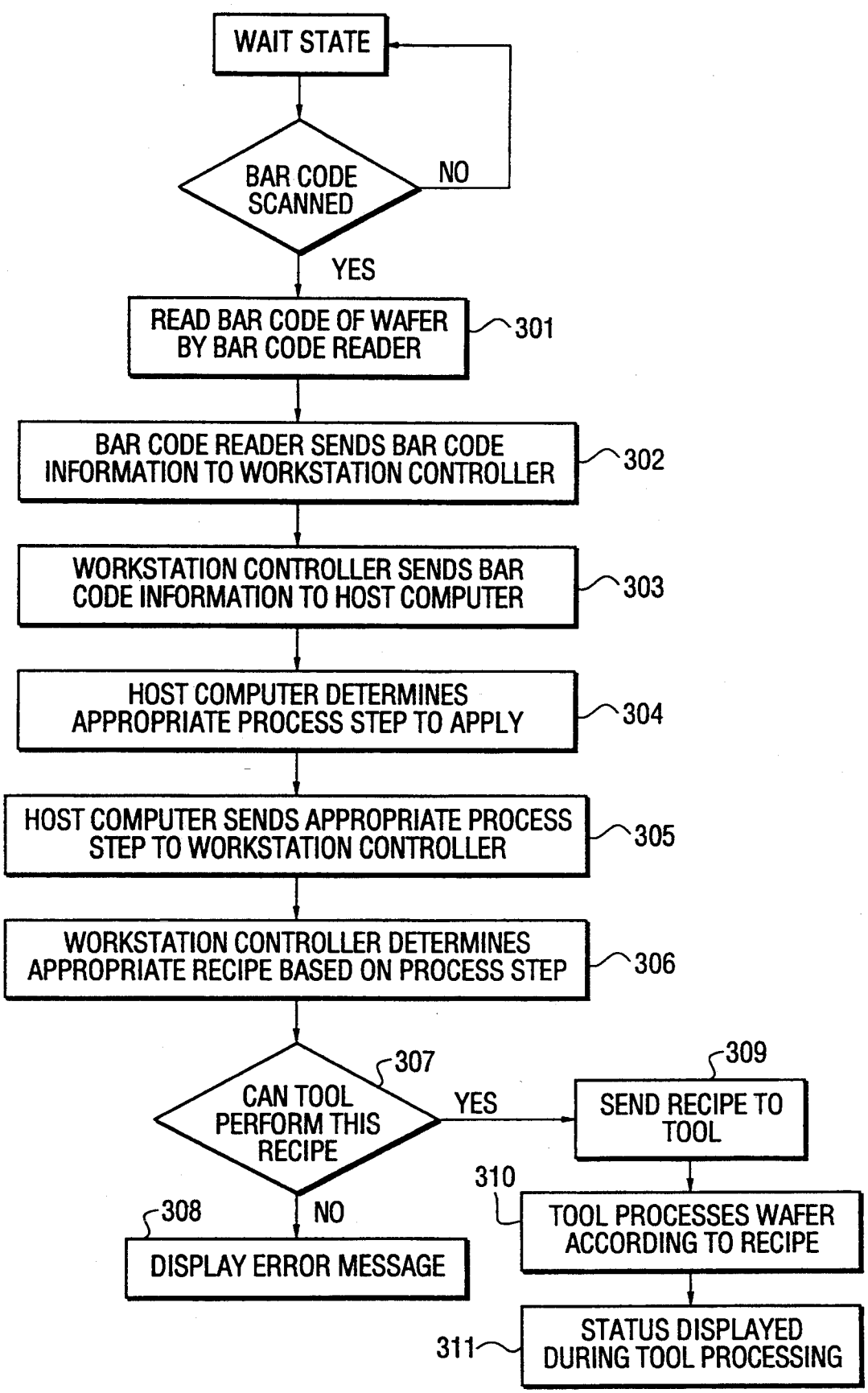
FIG. 3 is a flow diagram of the semiconductor processing system according to the present invention.

Referring now to FIG. 3, according to the present invention, an operator will utilize the barcode reader 40 to scan the runcard associated with a particular lot in step 301. The scanned information is then sent to the workstation controller 30 in step 302.

The workstation controller 30 sends the bar code information, identifying the lot, to the host computer 20 in step 303. The host computer 20 interprets the bar code information and according to the route that the lot is on and the steps that have been performed so far in the production process, the host computer determines the appropriate process step that should next be performed on that lot in step 304. The interface between the workstation controller 30 and the host computer 20 may be implemented, by way of example, using DEC-NET, a protocol developed by Digital Equipment Corporation for communication between computers. Other software protocols, e.g., Transport Control Protocol Interface Program (TCP/IP), can of course be utilized. The host computer 20 may track the product (i.e. the wafer) through the production process using software such as WORKSTREAM by CONSILIUM. Other communication software and production control software can of course be used in accordance with the teachings of the present invention.

The host computer 20 sends the step information to the workstation controller 30 in step 305. The workstation controller 30, utilizing a lookup table relating steps to specific recipes, selects in step 306, a specific recipe that is appropriate to that process step. The lookup table may be stored on the host computer 20 or at each workstation controller 30. If the information is stored in the host computer 20, the workstation controller 30 must access that information maintained by the host computer 20. Maintaining the lookup table on the host computer, simplifies updates to the table and ensures uniformity across the workstations.

The workstation controller determines in step 307 if the tool 10, assigned to the workstation controller 30, is capable of processing the wafer in accordance with the process step sent to the workstation controller 30 by the host computer 20. The tool 10 may not be capable of performing the process if, for example, the tool 10 may be busy processing another wafer. Alternatively, the tool 10 may not be capable of performing this particular step, i.e. no recipe is contained in the lookup table for the current specified step. If the tool is unable to perform the process, an error message is displayed on a monitor 60 directly connected to the tool 10 as is shown in step 308. An operator can then take appropriate action.

If the tool 10 is determined to be capable of processing the wafer, the workstation controller 30 sends process information to the tool in step 309 (e.g. a recipe name or other recipe identification or a complete recipe) which the tool 10 uses to process the wafer. The tool 10 then processes the wafer according to the process received by the tool 10 in step 310. During the entire process, the monitor 60 displays status (step 311) of the tool 10, the wafer, or which specific part of the recipe the tool 10 is currently performing.

Figure 4:
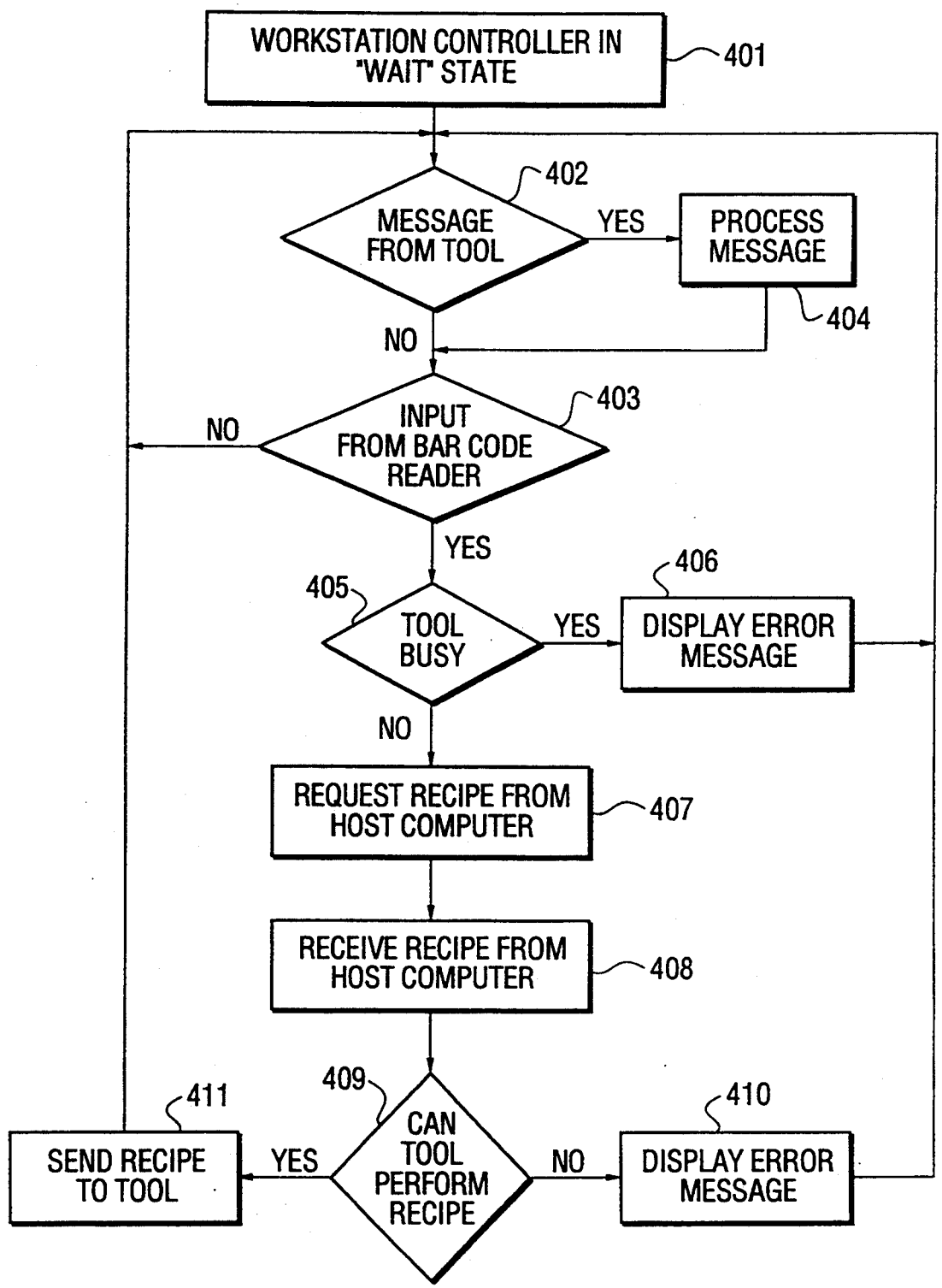
FIG. 4 is a flow diagram of the steps involved in performing a depositing process on a wafer using the teachings of the present invention.

Referring now to FIG. 4, a flowchart of the invention from the perspective of the workstation is shown. Initially, the workstation controller 30 is in a wait state 401, where it waits for messages in step 402 from the tool 10 or for a lot number read in step 403 by a bar code reader 40 attached to the workstation controller 30. When the tool 10 sends a message to the workstation controller 30, such as a time-stamped event logging, the workstation controller 30 processes such messages in step 404 and continues in its wait state for a bar code.

If a bar code is scanned, the workstation controller 30 then determines the status of the tool 10 in step 405. If the tool 10 is busy or is not in service, the workstation controller 30 will send out an error message in step 406 to the tool to be displayed on the monitor 60 to be viewed by an operator. If the tool 10 is not busy and it is in service, the workstation controller 30 will send a message in step 407 to the host computer 20 in which the lot information according to the scanned bar code is sent to the host computer 20. The host computer 20 then determines the appropriate process step to be performed next on the lot and sends this information to the workstation controller 30, which the workstation controller receives in step 408. The workstation controller 30 then determines if the tool 10 is capable of performing this process step by determining in step 409 if an appropriate recipe for the step is present in the lookup table. If the tool 10 is not capable of performing this process, an error message is output in step 410 to the tool to display on the monitor 60.

If the tool 10 is capable of performing this process, the workstation controller 30 sends the recipe information to the tool 10 in step 411, and the tool 10 receives this process information and proceeds to perform the process on the wafer.

While preferred embodiments of the invention have been described, modifications of the described embodiments may become apparent to those of ordinary skill in the art, following the teachings of the invention, without departing from the scope of the present invention as set forth in the appended claims.

What is claimed is:

1. A method for performing a process on a semiconductor wafer contained in a lot, comprising the steps of:
   scanning a bar code associated with said wafer using a bar code reader connected to a workstation controller, said bar code including lot information identifying said wafer;

providing said lot information to said workstation controller;

sending a request from said workstation controller to a host computer for a current process step to be performed on said wafer, said request including said lot information;

determining in said host computer said current process step according to said lot information;

sending information from said host computer to said workstation controller indicating said current process step;

sending process information from said workstation controller to a tool indicating a recipe to perform said current process step; and performing said recipe on said wafer by said tool.

2. A method as claimed in claim 1, further comprising the step of:

reading in said workstation controller a status message sent from said tool, wherein said status message includes status of said tool.

3. A method as claimed in claim 1, further comprising the step of:

in said workstation controller determining if said tool is capable of performing said process on said wafer, and if said tool is not capable of performing said process.

4. A method as claimed in claim 1, further comprising the steps of:

sending status information from said tool to a monitor directly connected to said tool, and displaying said status information by said monitor, wherein said status information includes status of said wafer, said tool, and said process.

5. A method as claimed in claim 1, further comprising the steps of:

sending an abort message from said workstation controller to said tool to not perform said process if said workstation controller determines that said tool cannot perform said process on said wafer;

sending said abort message from said tool to said monitor; and displaying said abort message by said monitor.

6. A method as claimed in claim 1, wherein:

said information indicating said current process step sent by said host computer to said workstation controller is a process step identification, wherein said process step identification is sent by said workstation controller to said tool, and wherein said process step identification is used by said tool to determine said process associated with said process step identification, said process being stored in said tool, and wherein said tool performs said process on said wafer according to said process step identification.

7. An apparatus for performing a process on a semiconductor wafer, said apparatus comprising:

a bar code reader configured to read a bar code identifying said wafer and to output a signal indicating said bar code;

a workstation controller coupled to said bar code reader, said workstation controller receiving lot information contained in said bar code identifying said wafer and outputting a request for a process step to apply said wafer, said request including said lot information;

a host computer communicatively connected to said workstation controller and receiving said request from said workstation controller, said host computer having means for determining an appropriate process step to apply to said wafer according to said lot information and for sending process information indicating said appropriate process step to said workstation controller, process determination means in said workstation controller for determining an appropriate process to perform on said wafer, said workstation controller providing process information identifying said appropriate process; and a tool communicatively connected to said workstation controller and receiving said process information, said tool applying said appropriate process to said wafer placed in said tool in accordance with said process information.

8. The apparatus as claimed in claim 7, further comprising:

a monitor communicatively connected to said tool; and sending means in said workstation controller for sending an error message to said tool for display on said monitor, said error message being sent by said workstation controller if said workstation controller determines that said tool is not able to perform said process on said wafer.

9. The apparatus as claimed in claim 8, further comprising:

a keyboard connected to said tool, said keyboard receiving input from an operator indicating a message, and wherein said message is sent to said workstation controller.

10. An apparatus as claimed in claim 7, further comprising:

a monitor directly connected to said tool for displaying status information sent to said monitor by said tool, wherein said status information includes status of said wafer, said tool, and said process.

11. An apparatus for performing a process on one or more wafers, said apparatus comprising:

a first and second bar code reader for reading a bar code identifying a semiconductor wafer and respectively providing first and second lot information indicative thereof;

a first workstation controller communicatively connected to said first bar code reader to receive said first lot information;

a second workstation controller communicatively connected to said second bar code reader to receive said second lot information;

a first and second tool communicatively connected to said first and second workstation controller, respectively;

a host computer communicatively connected to said first workstation controller and said second workstation controller, said host computer receiving first and second requests from said first and second workstation controller, respectively, and sending first step information to said first workstation controller, in response to said first request, corresponding to a first tool process step to be applied by said first tool, and for sending second step information to said second workstation controller, in response to said second request, corresponding to a second tool process step to be applied by said second tool;

process determination means in said first and second workstation controllers for determining a first tool process and a second tool process for said first and second tool, respectively, according to said first tool process step and said second tool process step, and means for providing said first and second tool processes to said first and second tools, respectively, wherein said first tool responds to said first provided tool process from said first workstation controller to perform said first tool process on a wafer placed in said first tool, and said second tool responds to said second provided tool process from said second workstation controller to perform said second tool process on a wafer placed in said second tool.

12. An apparatus as claimed in claim 11, further comprising:
  a first monitor connected to said first tool for displaying first status information sent by said first tool, wherein said first status information includes status of said first wafer, said first tool, and said first tool process applied to said wafer;
  a second monitor connected to said second tool for displaying second status information sent by said second tool, wherein said second status information includes status of said second wafer, said second tool, and said second tool process applied to said wafer.

* * * * *